(12) United States Patent
Findlay

(10) Patent No.: US 8,167,374 B2
(45) Date of Patent: May 1, 2012

(54) PORTABLE FOLDING CHAIR

(75) Inventor: Robert B. Findlay, Glencoe, IL (US)

(73) Assignee: Suntracker Products, LLC, Skokie, IL (US)

( * ) Notice: Subject to any disclaimer, the term of this patent is extended or adjusted under 35 U.S.C. 154(b) by 298 days.

(21) Appl. No.: 12/652,814

(22) Filed: Jan. 6, 2010

(65) Prior Publication Data

US 2011/0163586 A1 Jul. 7, 2011

(51) Int. Cl.
A47C 1/00 (2006.01)
(52) U.S. Cl. .............................. 297/344.26; 297/344.21
(58) Field of Classification Search ............. 297/344.21, 297/344.26
See application file for complete search history.

(56) References Cited

U.S. PATENT DOCUMENTS

| | | | |
|---|---|---|---|
| 3,025,116 A | 3/1962 | McMahan, Jr. | |
| 3,219,306 A | 11/1965 | Johnson et al. | |
| 3,296,935 A | 1/1967 | Johnson | |
| 4,076,346 A | 2/1978 | McMahan, Sr. | |
| 4,798,358 A | 1/1989 | Brauning | |
| 4,824,170 A | 4/1989 | Goldmeier | |
| 4,971,392 A * | 11/1990 | Young | 297/344.26 |
| 5,046,782 A | 9/1991 | Lundeen | |
| 5,580,129 A | 12/1996 | Findlay | |
| 5,611,594 A | 3/1997 | Findlay | |
| 6,048,029 A | 4/2000 | Percoco | |
| 6,315,360 B1 | 11/2001 | Guerrini | |
| 6,447,065 B1 * | 9/2002 | Ropp | 297/344.21 |
| 6,575,532 B2 | 6/2003 | Almerico | |
| 6,997,512 B1 * | 2/2006 | Yu | 297/344.26 |
| 7,325,875 B1 | 2/2008 | Guerrini | |
| 7,328,952 B2 | 2/2008 | Guerrini | |
| 2008/0265642 A1 | 10/2008 | Moyers | |
| 2009/0057519 A1 | 3/2009 | LaPointe | |

* cited by examiner

Primary Examiner — Anthony D Barfield
(74) Attorney, Agent, or Firm — Adam K. Sacharoff

(57) ABSTRACT

A swivel chair including a swivel-mounting assembly having a lower plate, and an upper plate, and bearings for rotatably mounting the upper plate to the lower plate. The lower plate and the upper plate defining an annular gap therebetween cooperating with the interior of the swivel-mounting assembly. The improvement includes an annular gasket having a first portion that receives the bearings is positioned in-between the plates. The annular gasket further having a second portion depending from the first. The second portion includes upper and lower sections extending from the first portion and have an inside facing section being in partial surface-to-surface contact with the lower and upper plates. Thus, the annular gasket prevents foreign particles from entering into the interior of the swivel-mounting assembly.

9 Claims, 6 Drawing Sheets

PORTABLE FOLDING CHAIR

FIELD OF THE INVENTION

The present invention relates to a portable folding chair, such as a beach chair.

BACKGROUND OF THE INVENTION

Portable folding chairs are well known and very properly. While basic folding chairs may just provide a seat and back, other more sophisticated chairs provide for a swivel base to allow the user to rotate the seat and back relative to the base. While these types of chairs are also known and patented, for example, co-owned U.S. Pat. No. 5,611,594, there is an increased need to provide improved folding swivel chairs. One important aspect to recognize is swivel chars typically contain ball bearings and grease to facilitate the rotation of the seat. However, if this area becomes contaminated with dirt or sand, the ability to rotate breaks down until rotation is no longer possible. Therefore the ability to provide an improved folding chair with a swivel base that prevents or reduces contamination is needed.

SUMMARY OF THE INVENTION

In accordance with the present invention there is provided in one embodiment a swivel chair including a swivel-mounting assembly having a lower plate, and an upper plate, and bearings for rotatably mounting the upper plate to the lower plate. The lower plate and the upper plate defining an annular gap therebetween cooperating with the interior of the swivel-mounting assembly. The improvement includes an annular gasket having a first portion that receives the bearings is positioned in-between the plates. The annular gasket further having a second portion depending from the first. The second portion includes upper and lower sections extending from the first portion and have an inside facing section being in partial surface-to-surface contact with the lower and upper plates. Thus, the annular gasket prevents foreign particles from entering into the interior of the swivel-mounting assembly.

In other aspects of the invention, the first portion of the annular gasket may include an inside terminal edge extending towards a center of the annular gasket such that the first portion extends and is in at least partial surface-to-surface contact with the lower support plate and the upper swivel-plate. The first position is preferably an annual ring, that includes a plurality of apertures spaced about the annual ring to evenly receive a plurality of ball bearings.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1A:
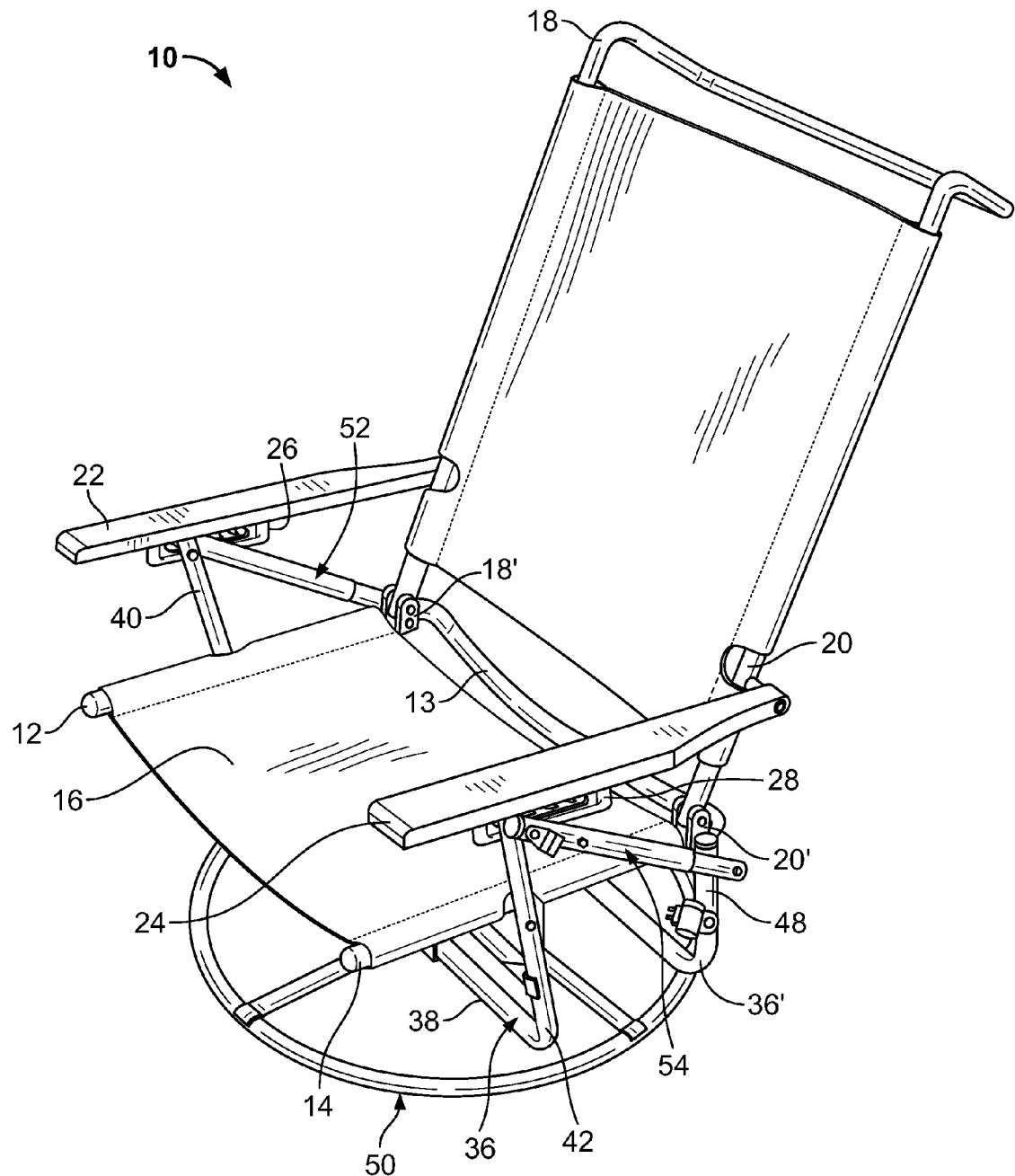
FIG. 1A is an isometric view of the portable folding chair of the invention.
Figure 1B:
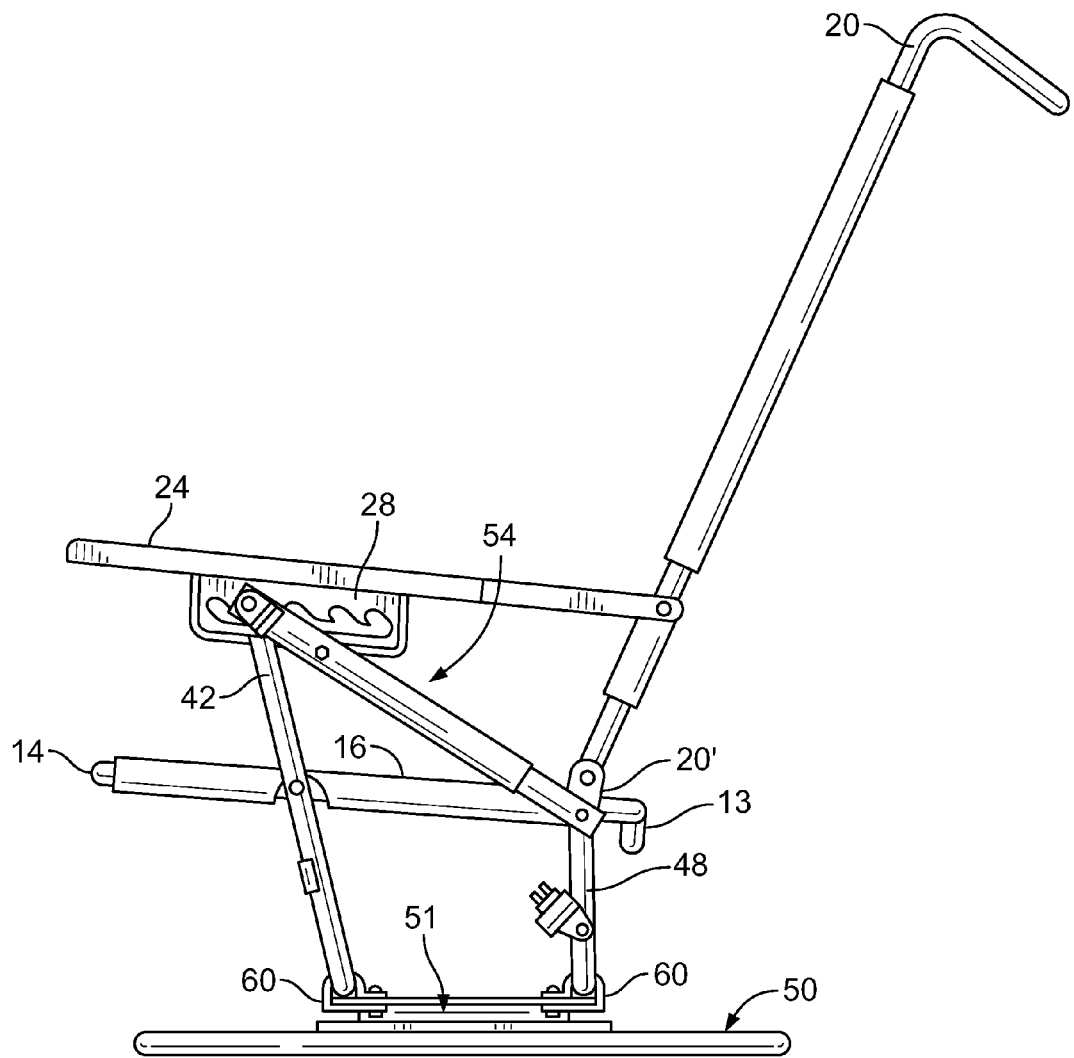
FIG. 1B is a side elevational view thereof.
Figure 1C:
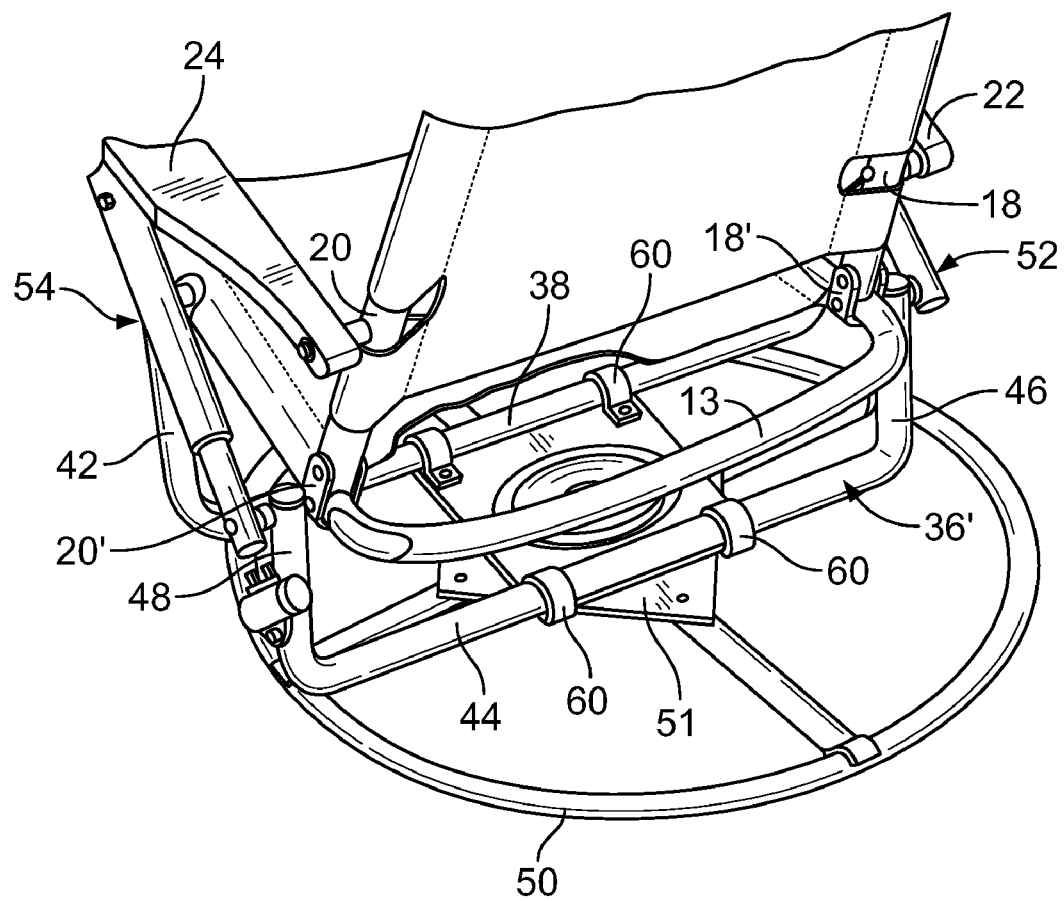
FIG. 1C is a rear isometric view thereof.
Figure 2:
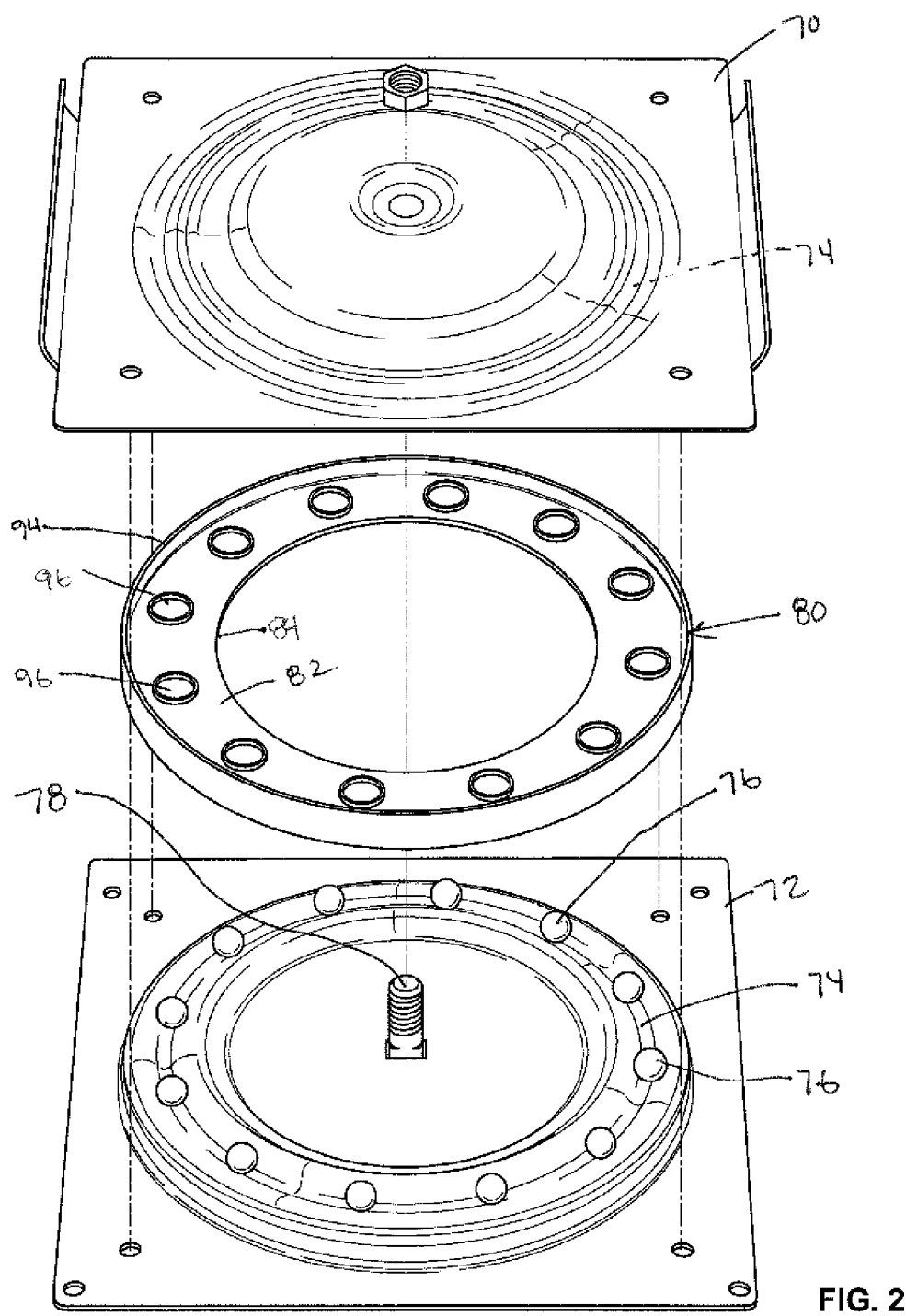
FIG. 2 is an exploded view of the swivel-mounting assembly.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring now to the drawings in greater detail, where like reference numerals indicate like parts, the portable folding chair of the invention is indicated generally by reference numeral 10. The chair 10 of the present invention has a pair of horizontal, seat-supporting, cylindrical tubes 12 and 14 to which are connected or mounted suitable material upon which a person may sit when the chair 10 is in its erected position. The suitable material thus constituting the seat 16 of the chair 10. The seat support tubes 12 and 14 form part of a U-shaped element completed by a rear, horizontal seat support tube 13. Projecting upwardly from the rear of the seat support tubes 12 and 14 are a pair of vertical, back-supporting tubes or rails 18 and 20 which together support suitable material for providing the seat-back of the chair. The tubes 18 and 20 are secured to the rear of the seat support tubes 12 and 14, respectively, by U-shaped pivot clamps 18' and 20', which allow the back support tubes 18 and 20 to pivot forwardly or rearwardly. A short way up along each vertical back support tubes 18 and 20, there is pivotally mounted the rear end-portion of an arm-rest 22 and 24, respectively. Mounted to the underside of each arm-rest 22 and 24 is an adjustment bracket 26 and 28, respectively, by means of which the seat-back tubes 18 and 20 may be vertically adjusted to change the slope of the seat-back.

The chair is supported on a support surface by means of a front, U-shaped support structure 36 and a rear, U-shaped structure 36'. The front, U-shaped support structure 36 is made up of a lower horizontal tube 38, and a pair of end-tubes 40 and 42. A middle section of each end-tube 40 and 42 is pivotally connected to a section of the horizontal, seat-supporting, cylindrical tubes 12 and 14, respectively. The upper ends of the end-tubes 40 and 42 are engaged with the adjustment brackets 26 and 28, respectively, by means of a pin, described hereinbelow.

Figure 3:
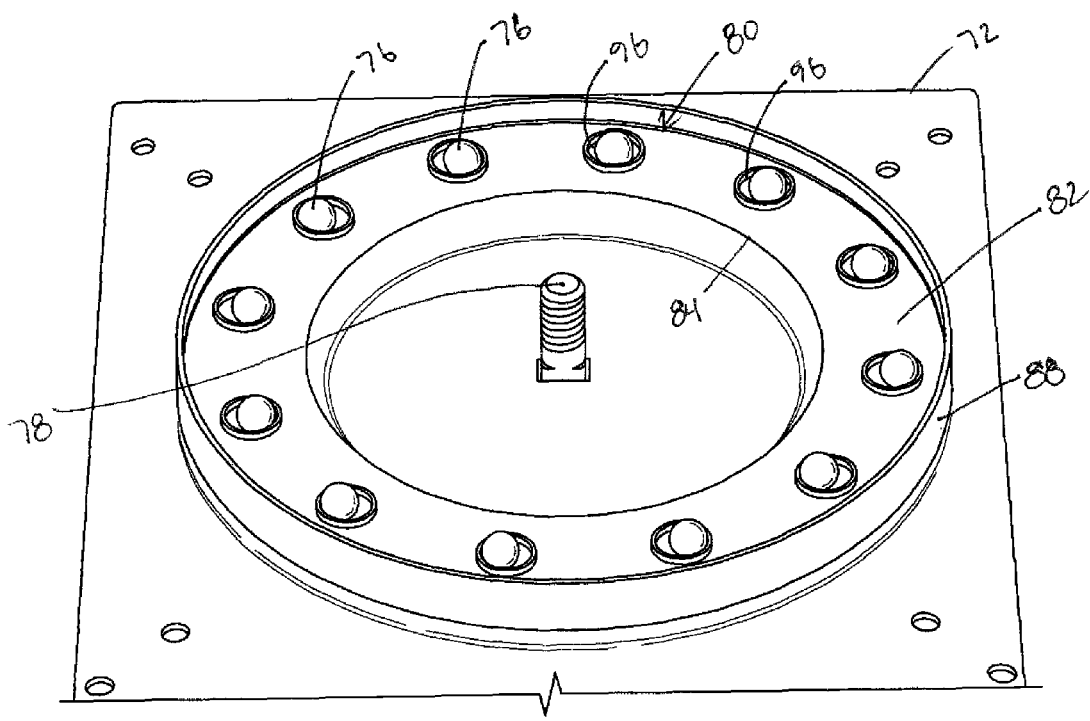
FIG. 3 is a isometric view of the lower support plate, annual gasket and ball bearings.
Figure 4:
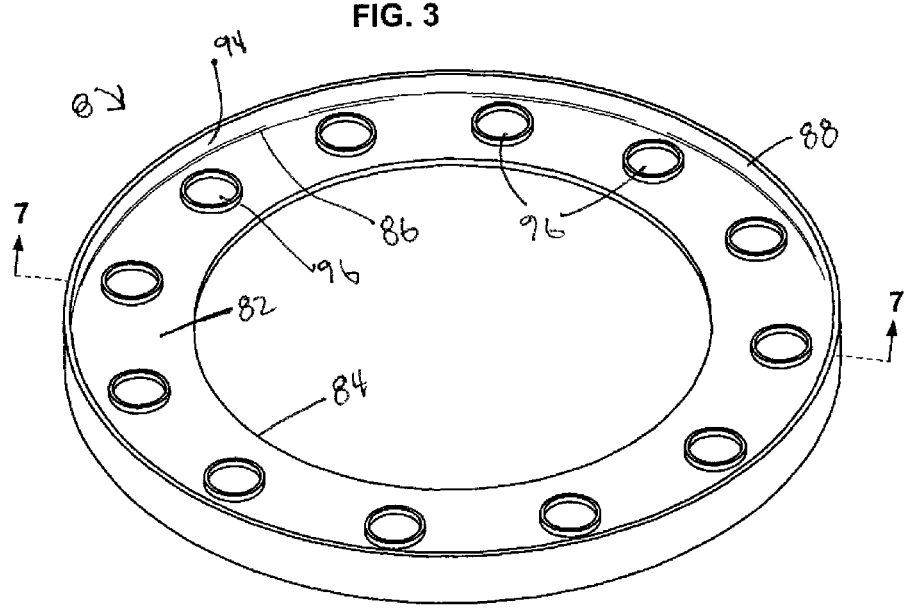
FIG. 4 is a isometric view of the annual gasket.
Figure 5:
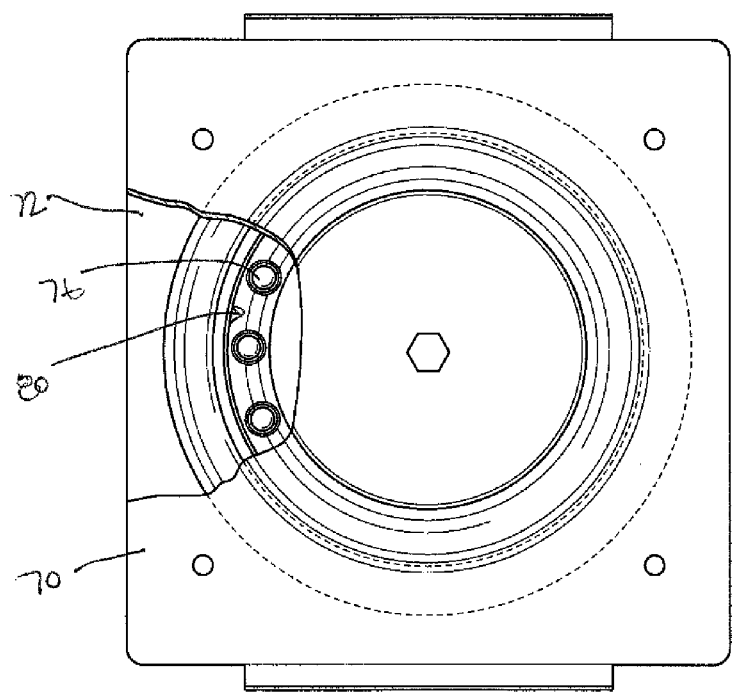
FIG. 5 is a top view, partially broken away, showing the swivel-mount of the chair with an annular gasket and ball-bearings.
Figure 6:
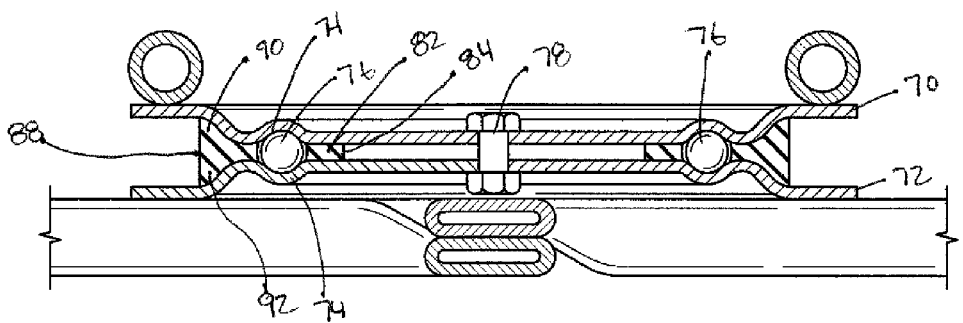
FIG. 6 is a cross-sectional view of the swivel-mounting assembly and chair.
Figure 7:
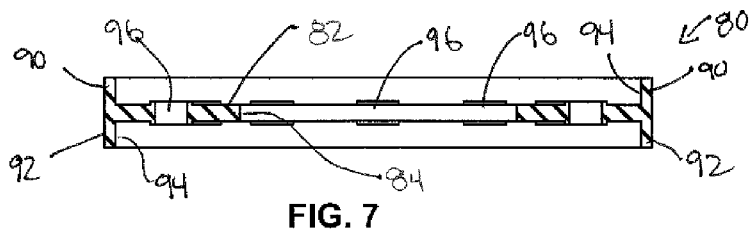
FIG. 7 is a cross-sectional view of the annual gasket from FIG. 4.

The rear, U-shaped structure 36' has a lower, horizontal tube or rail 44, and a pair of vertically-oriented end-tubes 46 and 48, projecting from the ends of the tube 44, as best seen in FIG. 3. The upper ends of the vertically-oriented tubes 46 and 48 are pivotally coupled to the rear end portions of the horizontal, seat-supporting, cylindrical tubes 12 and 14, respectively, at the location where the U-shaped pivot clamps 18' and 20' are located. The front and rear U-shaped support structures 36 and 38 may be mounted on a circular base 50 with a swivel mount assembly 51. The swivel mount assembly 51 is secured to the upper portion of the chair 52, or more particularly to the front and rear U shaped structures 36 and 36' by clamps 60.

Connecting the upper ends of front end-tubes 40 and 42 to the upper ends of the rear, vertically-oriented end-tubes 46 and 48 are a pair of telescoping members 52 and 54. The upper end of each telescoping member 52 and 54 is pivotally connected to the upper end of an end-tube 40 and 42, respectively. The upper end of the respective telescoping member 52 and 54 and the upper end of the respective end-tube 40 and 42 are sandwich between a respective adjustment-bracket 26 and 28. By pivoting up the arm-rests 22 and 24, the pivot pins 56 are disengaged, allowing the seat-back to be inclined or declined, upon which, the pins 56 are then re-engaged in a different notch or recess of each adjustment bracket 26 and 28. The lower end of each telescoping member 52 and 54 is pivotally connected by a pivot pin 55 to an upper end section of a rear vertical tube 46 or 48, respectively, which pivot pin 55 also extends through the respective tube 46 or 48 and through a respective U-shaped pivot clamps 18' and 20' that allow the seat-back tubes 18 and 20 to pivot forwardly or rearwardly, in order to pivotally mount the tubes 12, 14, that, together with the rear, horizontal tube 12', form part of the U-shaped element upon which the seat-proper material is mounted.

Referring now to FIGS. 2 through 7 there is shown the swivel mount assembly 51 that is attached to the circular base 50 and the upper portion of the chair 52. The swivel mount assembly 51 is comprised of an upper plate 70 and a lower plate 72, both having a circular recess or race 74 in which are located a series of ball bearings 76. The upper plate 70 is rotatably mounted on the lower plate by means of a central pivot shaft 78 and the ball bearings 76. To prevent sand or dirt from entering into the interior of the swivel mount assembly 51 and interfere with the rotation of the plates, there is provided an annular gasket 80 that completely covers and protects the annular races 74 in the lower and upper plates.

The annular gasket 80 includes an annular ring 82 section extending radially inward towards the center of the gasket 80. The annular ring 82 has an inward terminating edge 84 facing the center of the gasket 80 and has an outward edge 86 from which depends a lateral flange 88. More closely viewed, the lateral flange 88 has upper and lower wall sections 90 and 92, respectively, extending from the outward edge 86 which preferably communicates to an inside facing section 94 of about the middle region of the lateral flange 88. Spaced around the annular ring 82 are apertures 96 sized to receive the ball bearings 76.

When the gasket 80 is sandwiched between the upper and lower plates 70 and 72 (FIG. 6), the gasket 80 prevents sand and dirt from entering the ball bearings. First, the lateral flange 88 is positioned on the outer region of the two plates 70 and 72 or outside of the race. The space or void between the two plates on either side of the race 74 is filed with the annular ring 82. Furthermore, sand or dirt entering the plates from the center securing means 78 is prevented from entering the races 74 by the inward terminating edge 84.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. In a swivel chair comprising a seat, and a supporting structure for supporting said seat on a surface, said supporting structure including a swivel-mounting assembly by which said seat may be rotated relative said supporting structure, said swivel-mounting assembly having a lower support plate, and an upper swivel-plate, and bearing means for rotatably mounting said upper swivel-plate to the said lower support plate, said lower support plate and said upper swivel-plate defining an annular gap therebetween cooperating with the interior of said swivel-mounting assembly, wherein the improvement comprises:

an annular gasket having a first portion positioned in-between the lower support plate and the upper swivel-plate, the first portion having means for receiving the bearing means, the annular gasket further having a second portion depending from the first portion, the second portion being defined to include upper and lower sections extending from the first portion and having an inside facing section being in at least partial surface-to-surface contact with the lower support plate and the upper swivel-plate, whereby said annular gasket prevents foreign particles from entering into the interior of said swivel-mounting assembly without impeding the rotational movement of said upper swivel-plate.

2. The improvement of claim 1, wherein the first portion of the annular gasket includes an inside terminal edge extending towards a center of the annular gasket such that the first portion extends and is in at least partial surface-to-surface contact with the lower support plate and the upper swivel-plate.

3. The improvement of claim 2, wherein the first portion is an annual ring.

4. The improvement of claim 3, wherein the bearing means are a plurality of ball bearings and the annual ring includes a corresponding plurality of apertures spaced about the annual ring to evenly receive the plurality of ball bearings.

5. In a swivel chair comprising a seat, and a supporting structure for supporting said seat on a surface, said supporting structure including a swivel-mounting assembly by which said seat may be rotated relative said supporting structure, said swivel-mounting assembly having a lower support plate, and an upper swivel-plate, and bearing means for rotatably mounting said upper swivel-plate to the said lower support plate, said lower support plate and said upper swivel plate defining an annular gap therebetween cooperating with the interior of said swivel-mounting assembly, wherein the improvement comprises:

an annular gasket having an annual ring positioned in-between the lower support plate and the upper swivel-plate, the annual ring having means for receiving the bearing means, the annular gasket further having a second portion depending from the annual ring, the second portion being defined to include upper and lower sections extending from the annual ring and having an inside facing section being in at least partial surface-to-surface contact with the lower support plate and the upper swivel-plate, whereby said annular gasket prevents foreign particles from entering into the interior of said swivel-mounting assembly without impeding the rotational movement of said upper swivel-plate.

6. The improvement of claim 5, wherein the annual ring of the annular gasket includes an inside terminal edge extending towards a center of the annular gasket such that the annual ring extends and is in at least partial surface-to-surface contact with the lower support plate and the upper swivel-plate.

7. The improvement of claim 6, wherein the bearing means are a plurality of ball bearings and the annual ring includes a corresponding plurality of apertures spaced about the annual ring to evenly receive the plurality of ball bearings.

8. In a swivel chair comprising a seat, and a supporting structure for supporting said seat on a surface, said supporting structure including a swivel-mounting assembly by which said seat may be rotated relative said supporting structure, said swivel-mounting assembly having a lower support plate, and an upper swivel-plate, and a plurality of ball bearings for rotatably mounting said upper swivel-plate to the said lower support plate, said lower support plate and said upper swivel plate defining an annular gap therebetween cooperating with the interior of said swivel-mounting assembly, wherein the improvement comprises:

an annular gasket having an annual ring positioned in-between the lower support plate and the upper swivel-plate, the annual ring having a corresponding plurality of apertures spaced about the annual ring to evenly receive the plurality of ball bearings, the annular gasket further having a second portion depending from the annual ring, the second portion being defined to include upper and lower sections extending from the annual ring and having an inside facing section being in at least partial surface-to-surface contact with the lower support plate and the upper swivel-plate, whereby said annular gasket prevents foreign particles from entering into the interior of said swivel-mounting assembly without impeding the rotational movement of said upper swivel-plate.

9. The improvement of claim 8, wherein the annual ring of the annular gasket includes an inside terminal edge extending towards a center of the annular gasket such that the annual ring extends and is in at least partial surface-to-surface contact with the lower support plate and the upper swivel-plate.

\* \* \* \* \*